(12) United States Patent
Matsui et al.

(10) Patent No.: US 6,822,643 B2
(45) Date of Patent: Nov. 23, 2004

(54) IMAGE-DISPLAY CONTROL APPARATUS

(75) Inventors: Taichi Matsui, Kanagawa (JP); Yasuhiro Okuno, Tokyo (JP); Kenji Morita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 09/986,915

(22) Filed: Nov. 13, 2001

(65) Prior Publication Data

US 2002/0060648 A1 May 23, 2002

(30) Foreign Application Priority Data

Nov. 17, 2000 (JP) .................................. 2000-351991

(51) Int. Cl.[7] .............................................. G09G 5/00
(52) U.S. Cl. .......................... 345/204; 345/157; 345/8; 345/9
(58) Field of Search ................................ 345/204, 157, 345/158, 8, 9; 382/103, 111

(56) References Cited

U.S. PATENT DOCUMENTS 6,160,899 A * 12/2000 Lee et al. .................. 382/103

FOREIGN PATENT DOCUMENTS

| EP | 0 955 606 | 11/1999 |
| JP | 11-331874 | 11/1999 |

* cited by examiner

*Primary Examiner*—Jimmy H. Nguyen
(74) *Attorney, Agent, or Firm*—Fitzpatrick, Cella, Harper & Scinto

(57) ABSTRACT

An image-display control apparatus includes a detection unit for detecting a predetermined object from a photographed image, a position calculation unit for obtaining a positional relationship between the predetermined object in the photographed image detected by the detection unit and an object in a virtual image, an image removing unit for removing a predetermined partial image in the object in the virtual image by referring to a result of calculation of the position calculation unit, a synthesis unit for synthesizing the virtual image and the photographed image so that the predetermined object in the photographed image is present at a position of the partial image in the virtual image removed by the image removing unit, and a display control unit for displaying an image obtained as a result of synthesis of the synthesis unit on a display device.

38 Claims, 9 Drawing Sheets

IMAGE-DISPLAY CONTROL APPARATUS

BACKGROUND OF THE INVENTION

1. Field of the Invention

The present invention relates to an image generation system for generating a three-dimensional mixed spatial image by fusing a real-space image and a virtual-space image, and the like.

2. Description of the Related Art

Recently, in the field of various types of image processing, a technique of synthesizing a virtual-space image, such as CG (computer graphics) or the like, with a real-space image (photographed image) by fusing a real space and a virtual space is being used.

When intending to fuse a real space and a virtual space, image synthesis of an object in the real space and an object in the virtual space causes problems. As shown in FIG. 9, when intending to simply paste an object in a virtual space 901 making a real space 902 a background, the object in the virtual space 901 is always displayed in front of objects in the real space 902 (see a fused space 903).

However, an object in a virtual space is sometimes positioned behind an object in a real space. In such a case, it is necessary to display the object in the virtual space behind the object in the real space.

A system disclosed in Japanese Patent Application Laid-Open (Kokai) No. 11-331874 (1999), serving as a conventional technique for knowing the position of a moving object in a real space in real time, obtaining a fore and aft relationship with an object in a virtual space, and displaying an image which is consistent in the fore and aft relationship, includes a position sensor for time serially inputting standing-point-position information, a stereoscopic camera where a plurality of images are consecutively input time serially, and an image processing apparatus.

The image processing apparatus detects depth images from stereoscopic images, which are input in consecutive time series, assumes the observer's standing point in a future time at which the observer is provided with a three-dimensional image, based on a change in the standing point in the past which has been input from the position sensor, and consecutively changes consecutively obtained depth images into images from the assumed standing point in the future.

However, in the system disclosed in the above-described patent application, since the standing point is assumed only based on information relating to a change in the standing point in the past which has been time serially input from the position sensor, accuracy in assumption is insufficient from the viewpoint of providing a more precise composite real space.

SUMMARY OF THE INVENTION

The present invention has been made in consideration of the above-described problems.

It is an object of the present invention to provide a composite-reality providing system in which, when fusing a real space and a virtual space, by exactly knowing the positional relationship between an object in the real space and an object in the virtual space, a very precise three-dimensionally consistent mixed real space can be provided.

According to one aspect, the present invention which achieves the above-described object relates to an image-display control apparatus including detection means for detecting a predetermined object from a photographed image, position calculation means for obtaining a positional relationship between the predetermined object in the photographed image detected by the detection means and an object in a virtual image, image removing means for removing a predetermined partial image in the object in the virtual image by referring to a result of calculation of the position calculation means, synthesis means for synthesizing the virtual image and the photographed image so that the predetermined object in the photographed image is present at a position of the partial image in the virtual image removed by the image removing means, and display control means for displaying an image obtained as a result of synthesis of the synthesis means on display means.

According to another aspect, the present invention which achieves the above-described object relates to an image-display control apparatus including detection means for detecting a predetermined object from each of first and second photographed images obtained by photographing a real space, position calculation means for obtaining a positional relationship between the predetermined objects in the first and second photographed images detected by the detection means and an object in a virtual image, image removing means for removing predetermined partial images in the object in the virtual image by referring to a result of calculation of the position calculation means, synthesis means for forming a first synthesized image by synthesizing the virtual image and the first photographed image and forming a second synthesized image by synthesizing the virtual image and the second photographed image so that the predetermined objects in the first and second photographed images are present at respective positions of the partial images in the virtual image removed by the image removing means, and display control means for displaying the first synthesized image obtained by the synthesis means on display means for a left eye, and displaying the second synthesized image on display means for a right eye.

According to still another aspect, the present invention which achieves the above-described object relates to an image processing system including a camera for photographing a real space, a position/direction sensor for detecting a position and a direction of an object in the real space, a computer for synthesizing the photographed image photographed by the camera and a virtually formed virtual image, and display means for displaying an image obtained as a result of the synthesis by the computer. The computer includes image input means for inputting the photographed image photographed by the camera, detection means for detecting a predetermined object from the photographed image, position calculation means for obtaining a positional relationship between the predetermined object in the photographed image detected by the detection means and an object in a virtual image, image removing means for removing a predetermined partial image in the object in the virtual image by referring to a result of the calculation of the position calculation means, synthesis means for synthesizing the virtual image and the photographed image so that the predetermined object in the photographed image is present at a position of the partial image in the virtual image removed by the image removing means, and display control means for displaying an image obtained as a result of the synthesis of the synthesis means on the display means.

According to yet another aspect, the present invention which achieves the above-described object relates to an image generation system including first and second cameras for photographing the same real space, a position/direction sensor for detecting a position and a direction of an object in the real space, a computer for outputting first and second synthesized images by synthesizing first and second photographed images photographed by the first and second cameras, respectively, and a virtually formed virtual image, and display means for a right eye and display means for a left eye for displaying the first and second synthesized images, respectively. The computer includes image input means for inputting the first and second photographed images, detection means for detecting respective predetermined objects from the first and second photographed images, position calculation means for obtaining a positional relationship between the predetermined objects in the first and second photographed images detected by the detection means and an object in a virtual image, image removing means for removing predetermined partial images in the object in the virtual image by referring to a result of calculation of the position calculation means, synthesis means for forming a first synthesized image by synthesizing the virtual image and the first photographed image and forming a second synthesized image by synthesizing the virtual image and the second photographed image so that the predetermined objects in the first and second photographed images are present at respective positions of the partial images of the virtual image removed by the image removing means, and display control means for displaying the first synthesized image obtained by the synthesis means on display means for a left eye, and displaying the second synthesized image on display means for a right eye.

According to still another aspect, the present invention which achieves the above-described object relates to an image-display control method including a detection step of detecting a predetermined object from a photographed image, a position calculation step of obtaining a positional relationship between the predetermined object in the photographed image detected in the detection step and an object in a virtual image, an image removing step of removing a predetermined partial image in the object in the virtual image by referring to a result of the calculation in the position calculation step, a synthesis step of synthesizing the virtual image and the photographed image so that the predetermined object in the photographed image is present at a position of the partial image in the virtual image removed in the image removing step, and a display control step of displaying an image obtained as a result of synthesis in the synthesis step on display means.

According to still another aspect, the present invention which achieves the above-described object relates to an image-display control method including a detection step of detecting a predetermined object from each of first and second photographed images obtained by photographing the same real space, a position calculation step of obtaining a positional relationship between the predetermined objects in the first and second photographed images detected in the detection step and an object in a virtual image, an image removing step of removing predetermined partial images in the object in the virtual image by referring to a result of calculation in the position calculation step, a synthesis step of forming a first synthesized image by synthesizing the virtual image and the first photographed image, and forming a second synthesized image by synthesizing the virtual image and the second photographed image so that the predetermined objects in the first and second photographed images are present at respective positions of the partial images of the virtual image removed in the image removing step, and a display control step of displaying the first synthesized image obtained in the synthesis step on display means for a left eye, and displaying the second synthesized image on display means for a right eye.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Figure 1:
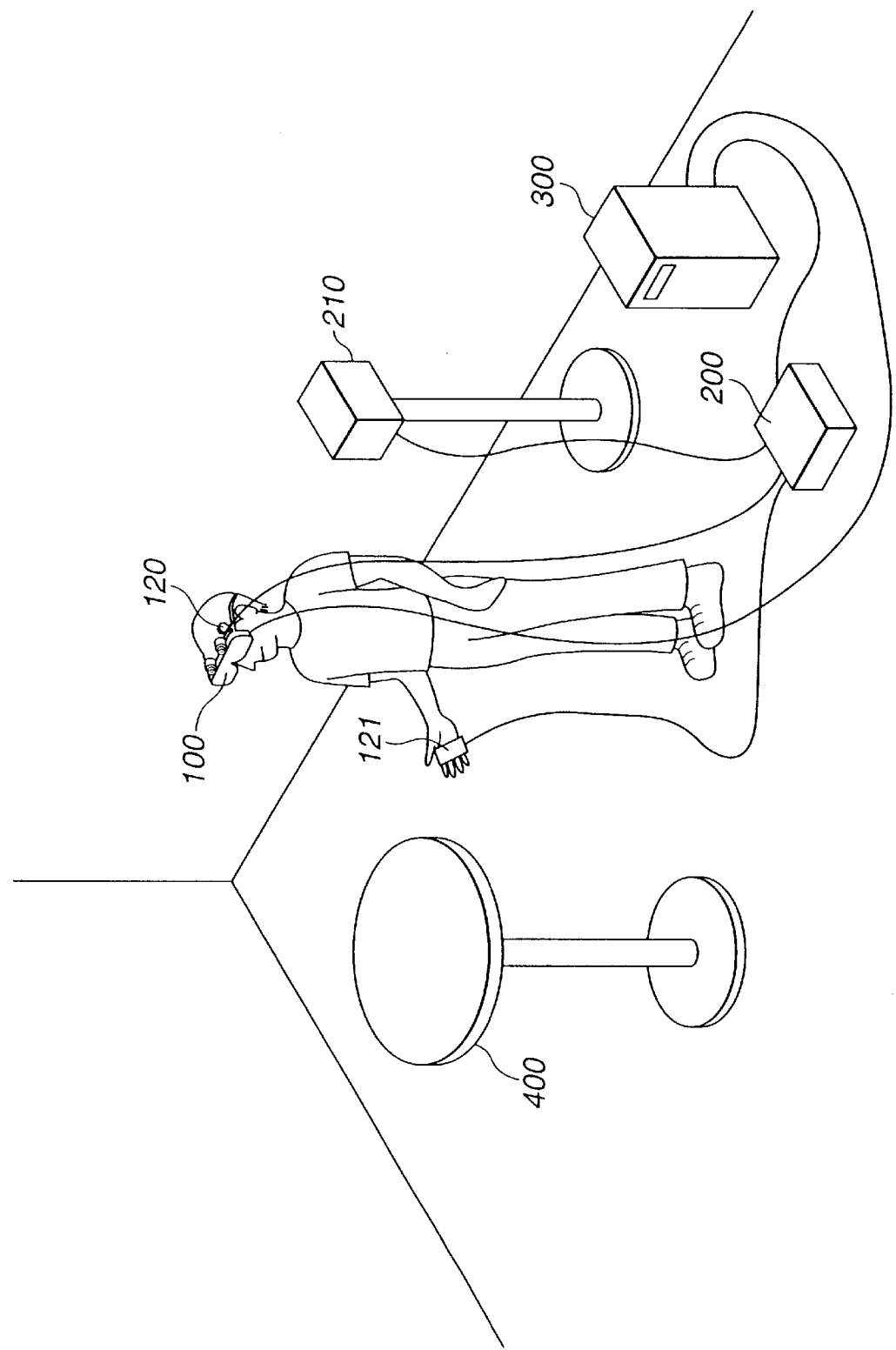
FIG. 1 is a diagram illustrating an appearance and an outline of a composite-reality providing system according to an embodiment of the present invention.

A preferred embodiment of the present invention will now be described with reference to the drawings. FIG. 1 is a diagram illustrating an appearance and an outline of a composite-reality providing system according to the preferred embodiment.

As shown in FIG. 1, in this composite reality providing system, the player wears a video see-through-type head-mount display 100. A HMD (head-mount display)-position sensor 120 is mounted on the head-mount display 100, and is connected to a three-dimensional position sensor main body 200 via a cable.

A palm-position sensor 121 is mounted on a palm of the player, and is also connected to the three-dimensional position sensor main body 200.

The thee-dimensional position sensor main body 200 is connected to a three-dimensional-position-sensor fixed station 210 for reading the positions of the moving position sensors 120 and 121, and a computer 300 via cables.

The principle of these position sensors will now be described. That is, the position sensors 120 and 121 detect the movement (the position and the direction) of the player by changes in magnetic lines of force provided by the magnetic field generated by the three-dimensional-position-sensor fixed station 210, and transmit obtained information to the three-dimensional position sensor main body 200. After converting the received information into information relating to the position and the direction of the player, the three-dimensional position sensor main body 200 supplies the computer 300 with the resultant information.

The player enters a game field 400, and feels a three-dimensional image provided by the composite-reality providing system. For example, within the game field 400, when assuming a case in which an organism or the like by a virtual image moves around a hand where the palm-position sensor 121 is mounted, the organism performs various movements behind and in front of the hand.

Figure 2A:
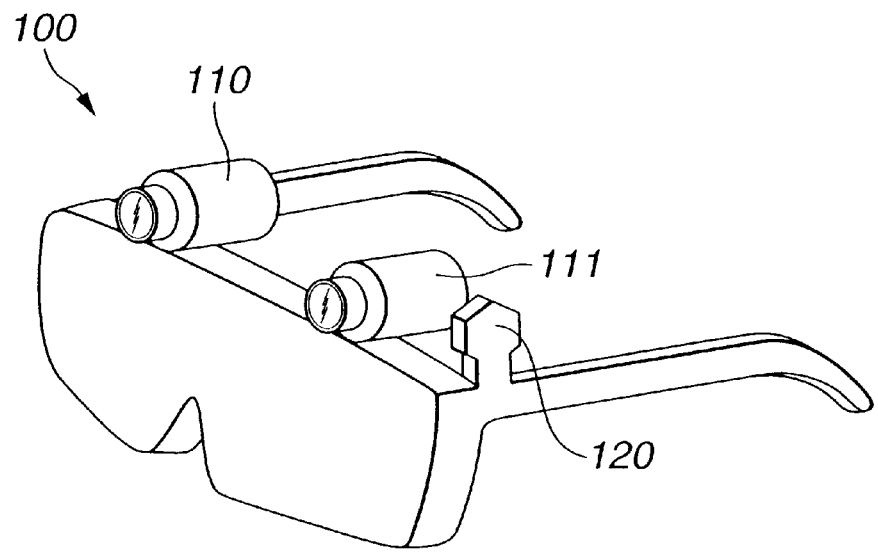
FIGS. 2A and 2B are diagrams, each illustrating an appearance and the structure of a head-mount display 100 shown in FIG. 1.
Figure 2B:
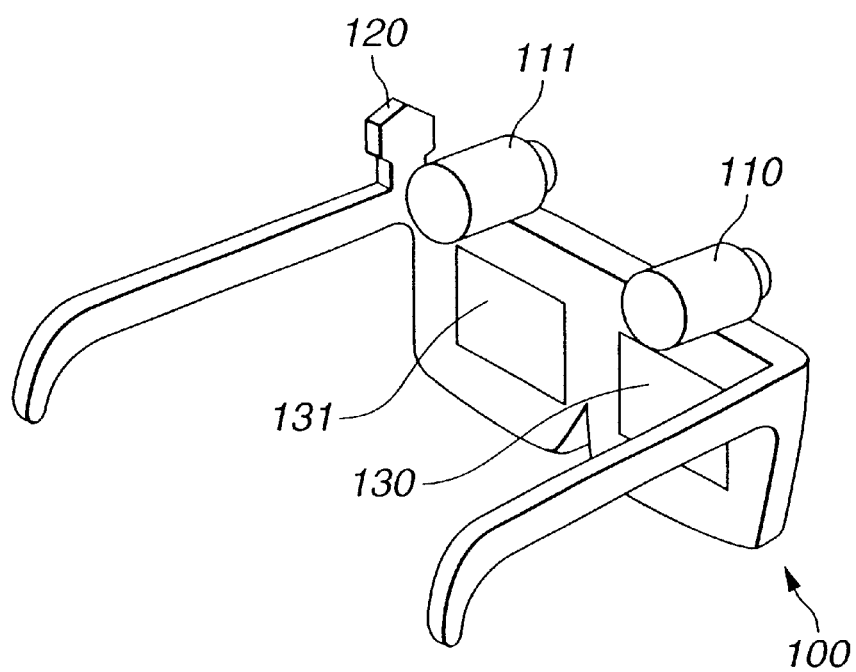

FIGS. 2A and 2B are diagrams, each illustrating an appearance and the structure of the head-mount display 100 shown in FIG. 1: FIG. 2A illustrates the front side; and FIG. 2B illustrates the back side having LCD (liquid-crystal display) surfaces.

The head-mount display 100 is a video see-through-type display in which images photographed by a camera are displayed on display units, each comprising a LCD or the like, and includes a right-eye camera 110, a left-eye camera 111, a right-eye LCD 130, a left-eye LCD 131, and the HMD-position sensor 120.

The right-eye camera 110 and the left-eye camera 111 correspond to the standing point of the player's right eye and the standing point of the player's left eye, respectively. An image photographed by the right-eye camera 110 is first input to the computer 300, and is then displayed on the right-eye LCD 130 by being fused with a virtual space (a virtual image). Similarly, an image photographed by the left-eye camera 111 is first input to the computer 300, and is then displayed on the left-eye LCD 131 by being fused with the virtual space.

Figure 3:
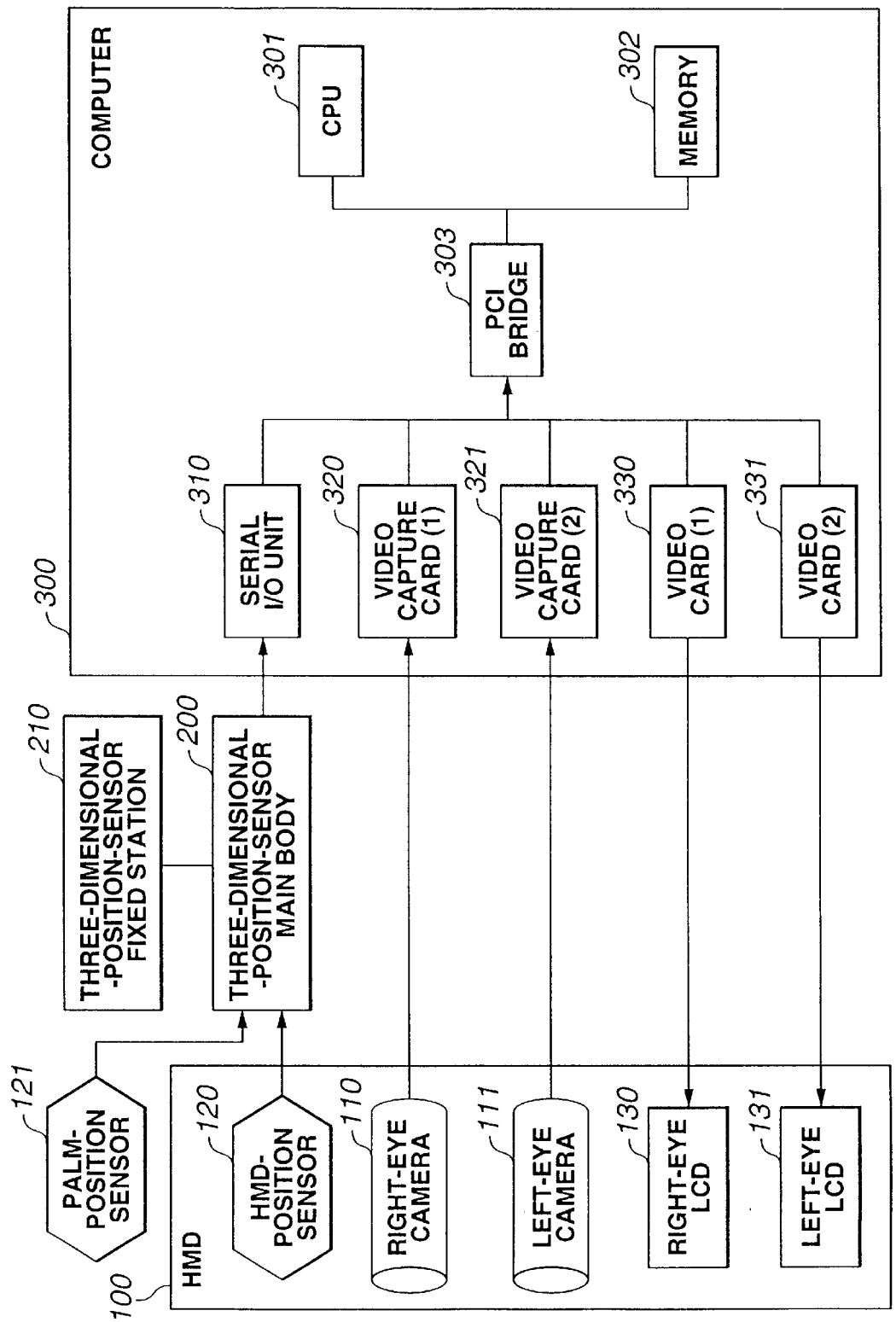
FIG. 3 is a block diagram illustrating the configuration of the composite-reality providing system shown in FIG. 1.

FIG. 3 is a block diagram illustrating the configuration of the composite-reality providing system of the embodiment. In FIG. 3, the computer 300 includes a CPU (central processing unit) 301 and a memory 302 as main components. The CPU 301 and the memory 302 are connected to a serial I/O (input/output) unit 310, a video capture card (1) 320, a video capture card (2) 321, a video card (1) 330, and a video card (2) 331 via a PCI (Peripheral Component Interconnect) bridge 303.

The serial I/O unit 310 is connected to the three-dimensional position sensor main body 200. The video capture card (1) 320, the video capture card (2) 321, the video card (1) 330 and the video card (2) 331 are connected to the right-eye camera 110, left-eye camera 111, the right-eye LCD 130 and the left-eye LCD 131, respectively.

Figure 4:
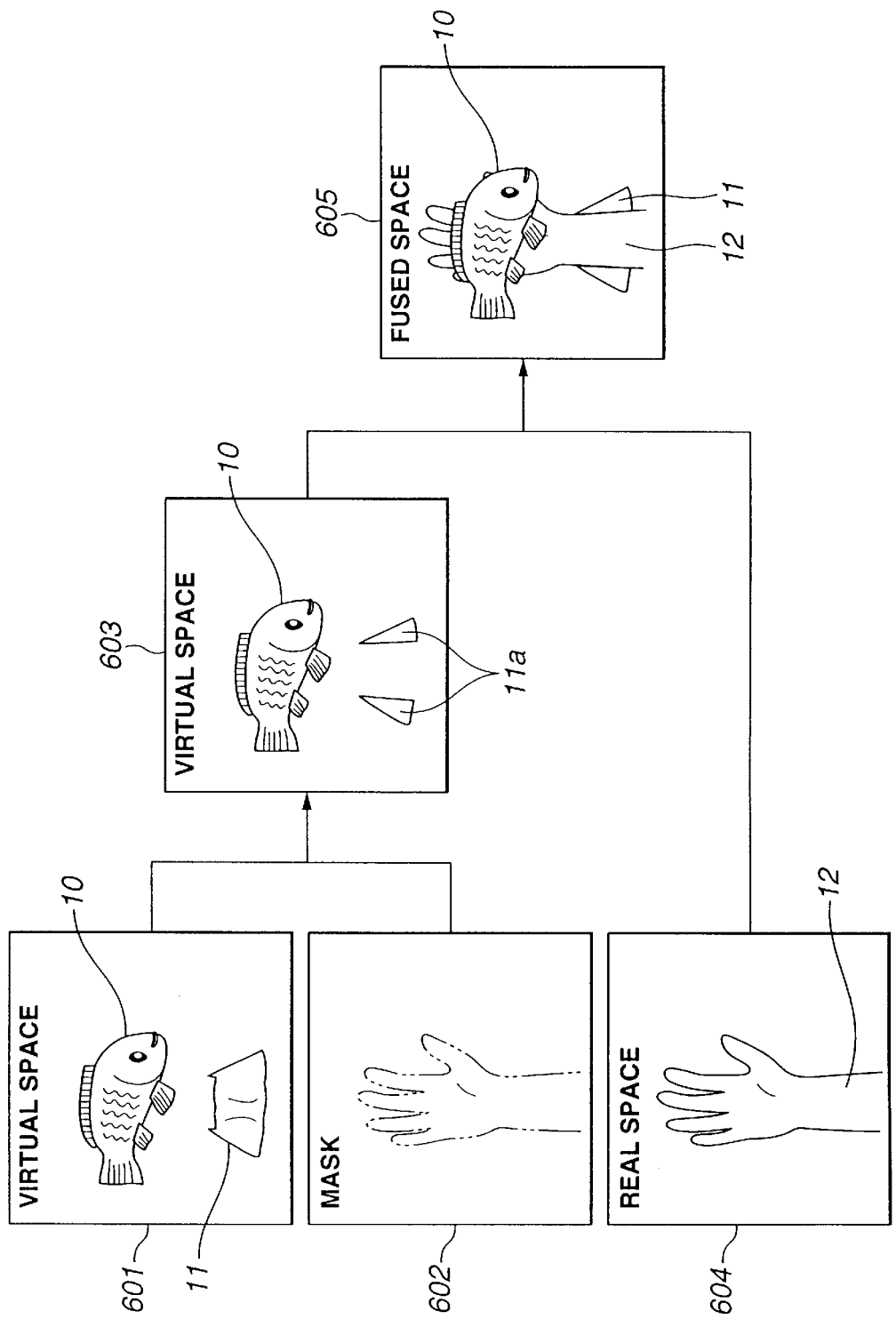
FIG. 4 is a diagram illustrating an image of image synthesis processing by the system shown in FIG. 1.

Next, a description will be provided of an outline of image synthesis processing by the system of the embodiment having the above-described configuration, i.e., processing of superposing an image in a real space (a photographed image) and an image in a virtual space (a virtual image), with reference to FIG. 4.

Figure 9:
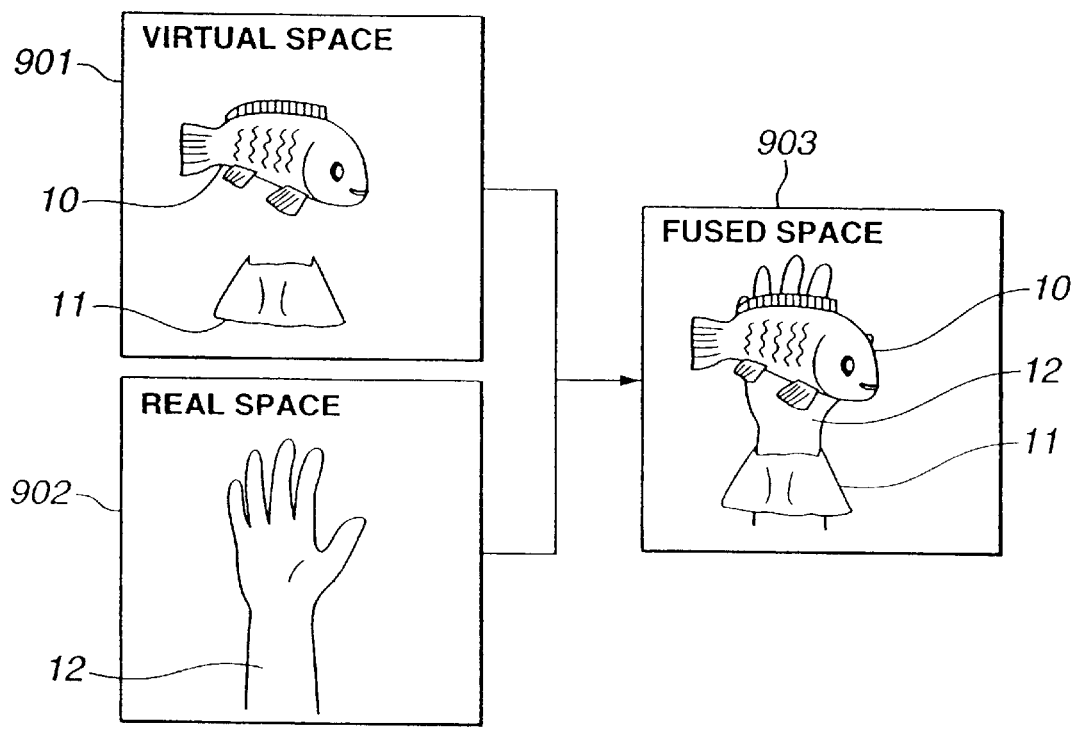
FIG. 9 is a diagram illustrating an image of conventional synthesis processing as an image.

In a case in which a fish 10 and a rock 11 are present in the virtual space 601, a man's hand 12 is present in the real space 604, and composite reality is provided such that, as shown in a fused space 605 in FIG. 4, the fish 10 in the virtual space is present in front of the man's hand 12 in the real space, and the rock 11 in the virtual space is present behind the man's hand 12 in the real space. If, as shown in FIG. 9, the object in the virtual image 901 is simply superposed on the object in the real space 902, the fish 10 and the rock 11 are positioned in front of the man's hand 12 in the fused space 903. As a result, fusion of the virtual space and the real space does not succeed.

Accordingly, in this system, a portion to be hidden in the real space is removed from the virtual space using a mask having the shape of the man's hand.

That is, as shown in FIG. 4, a mask 602 having the shape of the man's hand is covered in a virtual space 601. At that time, masking processing is performed based on a priority order for each object. The first, second and third priority orders are given in this embodiment to the fish 10, the man's hand 12 and the rock 11, respectively, from the front side. If masking processing is performed with these priority orders, the fish 10 is displayed as it is because it is present in front of the man's hand 12, and a portion of the rock 11 overlapping with the mask 602 having the shape of the man's hand is removed because the rock 11 is present behind the man's hand 12 (see reference numeral 11a in FIG. 4).

The image in the virtual space after the masking processing is as represented by reference numeral 603 shown in FIG. 4. The fused space 605 is obtained by synthesizing the image 603 and a real space 604. In the fused space 605, the fish 10 is positioned in front of the man's hand 12 and the rock 11 is positioned behind the man's hand 12.

As described above, in this system, when fusing a real space and a virtual space, it is always possible to provide a composite real space which is three-dimensionally consistent, whether an object in the real space is at the front side or an object in the virtual space is at the front side.

Figure 5:
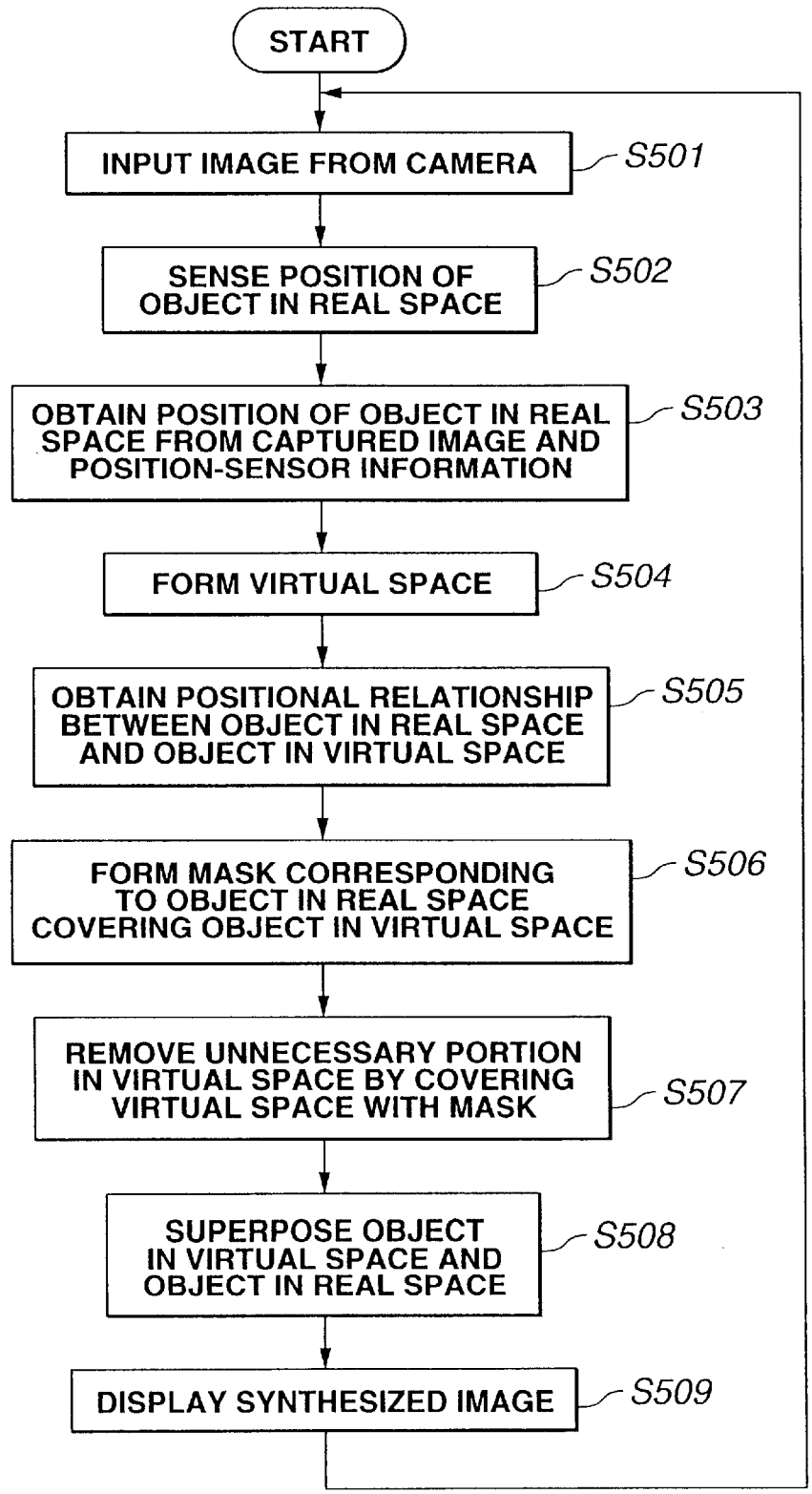
FIG. 5 is a flowchart illustrating the processing of a computer 300 shown in FIG. 3 from input of an image from a camera to synthesis of a real space and a virtual space.
Figure 6A:
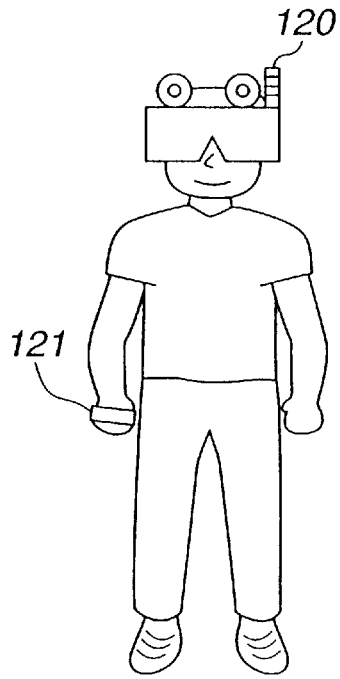
FIGS. 6A–6D are diagrams, each illustrating a pose of a player which is necessary for pre-processing performed before play.
Figure 6B:
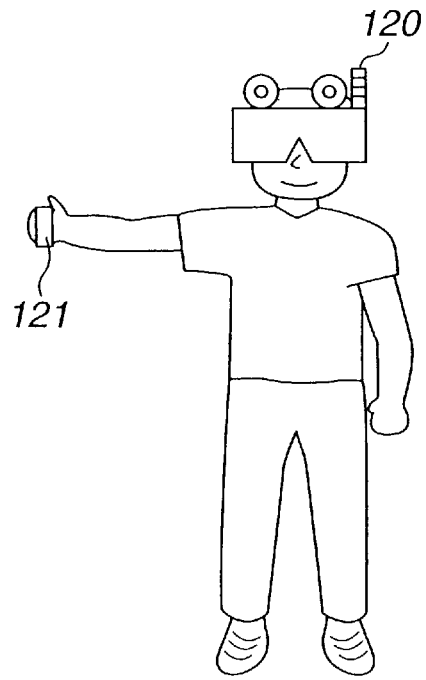
Figure 6C:
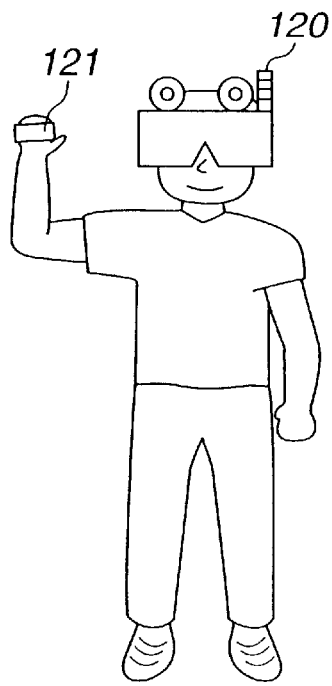
Figure 6D:
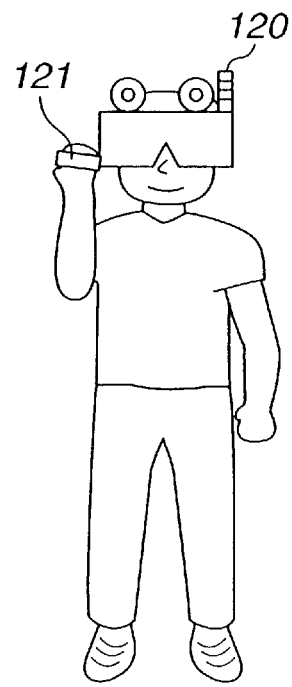

The details of the operation of this system will now be described with reference to FIGS. 5–8. FIG. 5 is a flowchart illustrating the processing of the computer 300 from input of an image from the camera to synthesis of a real space and a virtual space. FIGS. 6A–6D are diagrams, each illustrating a pose of a player which is necessary for pre-processing performed before the play.

This system is a stereoscopic-camera system using two cameras, i.e., the right-eye camera 110 and the left-eye camera 111. Since processing performed in each of the right-eye system and the left-eye system is entirely the same, only processing in the right-eye system will be described. By storing a program for the flowchart shown in FIG. 5 in a storage device, such as the memory 302 within the computer 300, or the like, and causing the program to operate, the following control method can be realized.

First, the player takes predetermined poses before playing, and the positions of the position sensors 120 and 121 at each of the predetermined poses are obtained. In this embodiment, four poses, for example, a state in which an arm is straightly lowered (see FIG. 6A), a state in which the arm is horizontally stretched (see FIG. 6B), a state in which the arm is horizontally stretched and then the elbow is bent (see FIG. 6C), and a state in which the arm is horizontally stretched in the forward direction and then the elbow is bent (see FIG. 6D), are provided. By analyzing the position and the posture of the player based on these four poses, more accurate estimation of the position can be realized.

When the system has been started, then, in step S501, an image signal is transmitted from the right-eye camera 110 to the video capture board 320. The computer 300 captures an image from the right-eye camera 110 via the video capture card 320.

Then, in step S502, the three-dimensional-position-sensor fixed 10 station 210 detects the positions of the HMD-position sensor 120 and the palm sensor 121, and assumes the position and the shape of the arm of the player (the object) from the positions detected by the two sensors 120 and 121.

A method for assuming the position and the shape of the arm will be described later with reference to FIGS. 7A and 7B.

In step S503, the portion of the object (arm) is more precisely obtained from the image captured in step S501, based on position information assumed from the position sensors 120 and 121 in step S502.

Then, in step S504, a virtual space is formed. Then, in step S505, the positional relationship between the object in the real space assumed in step S503 and the object in the virtual space formed in step S504 is obtained.

Then, in step S506, an external mask corresponding to the shape of the object in the real space which is to cover the virtual space is formed. A method for forming the external mask will be described later with reference to FIG. 8.

Then, in step S507, a portion not to be displayed in the virtual space (603 shown in FIG. 4) is removed by superposing the mask (602 shown in FIG. 4) on the virtual space (601 shown in FIG. 4).

Then, in step S508, the object (603 shown in FIG. 4) and the object in the real space (604 shown in FIG. 4) are superposed. The resultant synthesized image (605 shown in FIG. 4) is an image based on the depth in the three-dimensional space.

Then, in step S509, the synthesized image is displayed. The process then returns to step S501, and the same processing is performed.

Figure 7A:
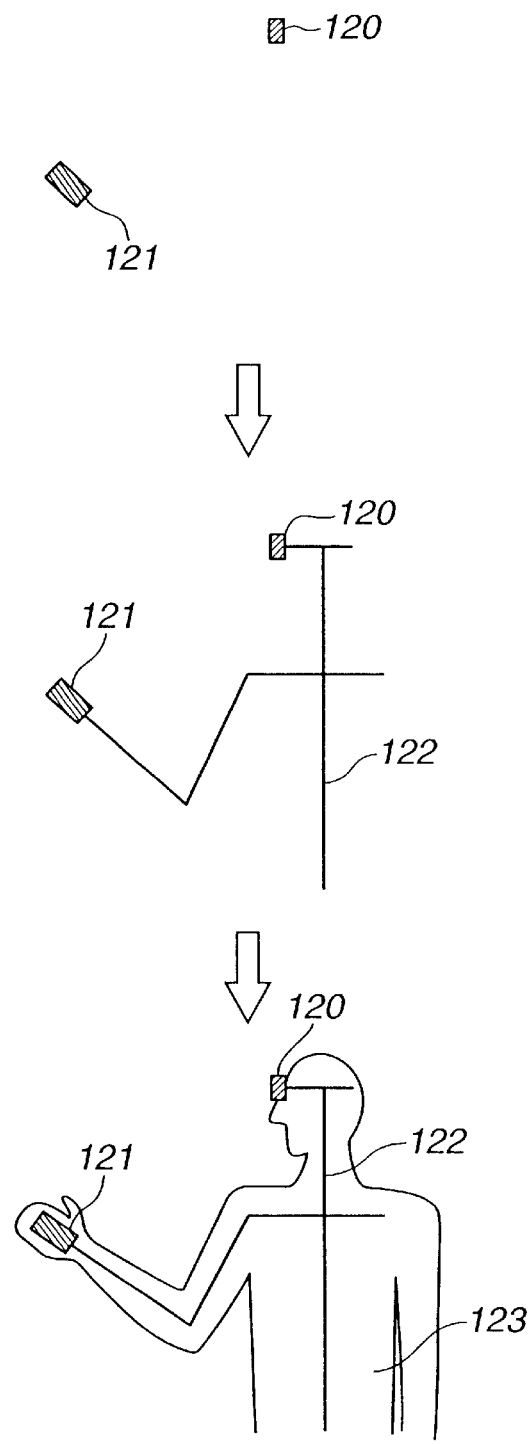
FIGS. 7A and 7B are diagrams, each illustrating an image of a method for assuming the position and the shape of an arm using position sensors 120 and 121 shown in FIG. 1.
Figure 7B:
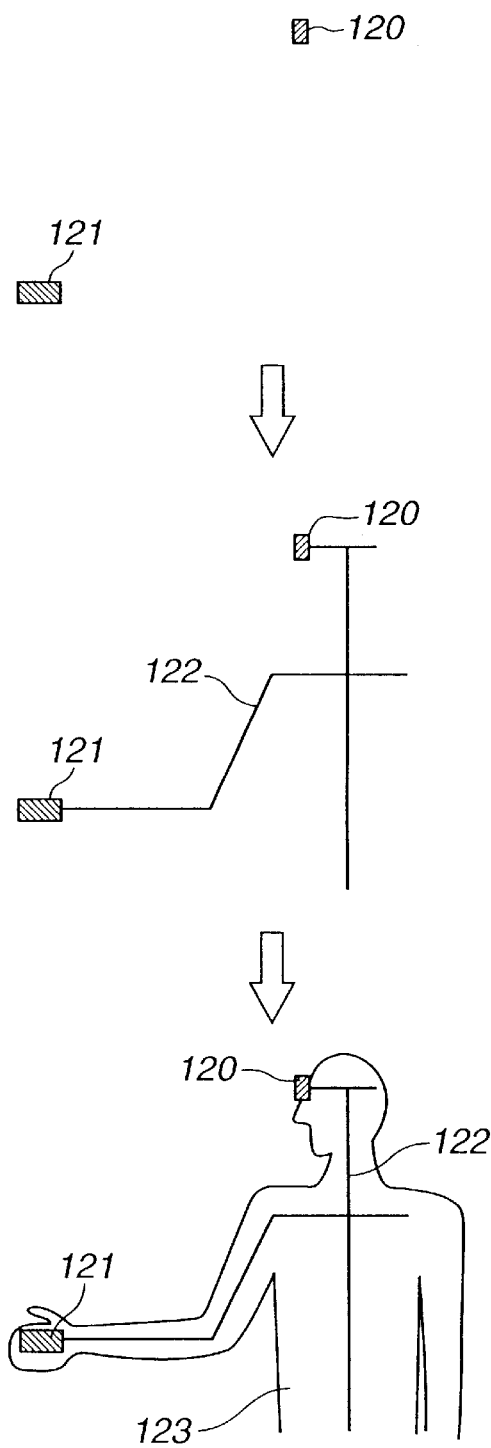

FIGS. 7A and 7B are diagrams, each illustrating an image of a method for assuming the position and the shape of the arm from the position sensors 120 and 121: FIG. 7A illustrates an example of the shape of the arm; and FIG. 7B illustrates another example of the shape of the arm.

As shown in FIGS. 7A and 7B, first, the position of each of the position sensors 120 and 121 is detected. Then, a frame model 122 is formed by performing assumption based on the detected position and direction of each of the sensors 120 and 121. Finally, a human model is formed by putting flesh on the frame 122.

In FIGS. 7A and 7B, the sensors 120 have the same position, and the sensors 121 have different positions and directions. However, as described above, the flow of basic processing is entirely the same.

Figure 8:
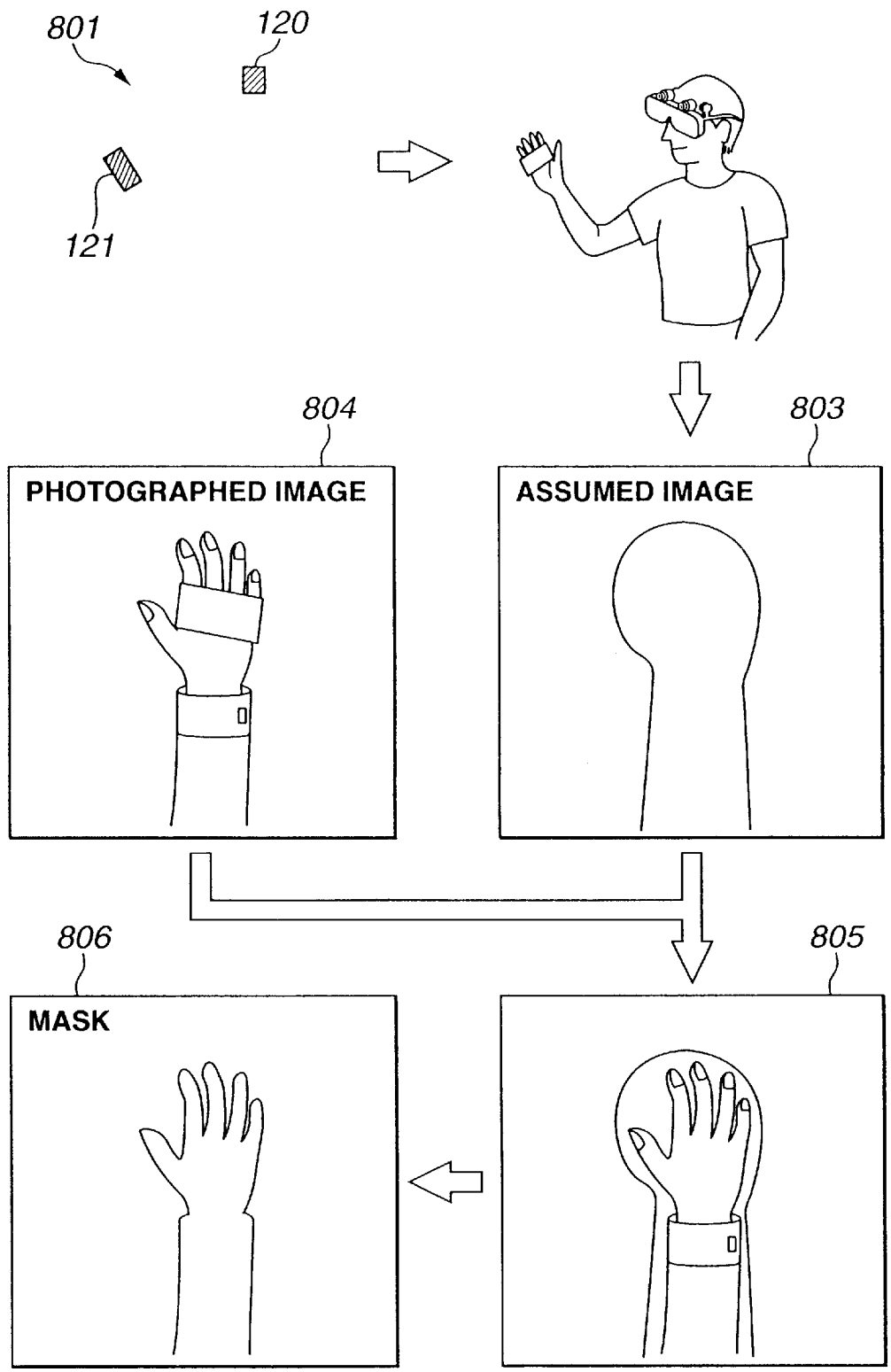
FIG. 8 is a diagram illustrating an image of a method for forming an external mask by combining position information from the position sensors 120 and 121 and position information from a photographed image.

FIG. 8 is a diagram illustrating an image of a method for forming an external mask by combining position information from the position sensors 120 and 121 and position information from the photographed image.

First, in step 801, sensor-position information is received from the position sensors 120 and 121. Then, in step 802, the position and the posture of the player are assumed from the sensor-position information obtained in the above-described step 802. When the position and the posture of the player are known, the position and the direction of the camera can also be assumed simultaneously.

In step 803, an image to be photographed by the cameras 110 and 111 is assumed and constructed from the position and the posture of the player obtained in step 802, and the position and the direction of each of the cameras 110 and 111.

In parallel to the above-described steps 801–803, in step 804, an input image from each of the cameras is captured. Then, in step 805, the outer shape of the arm is extracted based on the assumed image constructed in step 803, from the photographed images obtained in step 804. The outer shape thus extracted is used as a mask (step 806).

The present invention is not limited to the apparatus of the above-described embodiment, but may also be applied to a system comprising a plurality of apparatuses, or to an apparatus comprising a single unit. The present invention may, of course, be realized by supplying a system or an apparatus with a storage medium storing program codes of software for realizing the functions of the above-described embodiment, and reading and executing the program codes stored in the storage medium by means of a computer (or a CPU or an MPU (microprocessor unit)) of the system or the apparatus.

In such a case, the program codes themselves read from the storage medium realize the functions of the above-described embodiment, so that the storage medium storing the program codes constitutes the present invention. For example, a floppy disk, a hard disk, an optical disk, a magnetooptical disk, a CD(compact disc)-ROM (read-only memory), a CD-R (recordable), a magnetic tape, a nonvolatile memory card or a ROM may be used as the storage medium for supplying the program codes. The present invention may, of course, be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiment are realized by the processing.

As described above in detail, when fusing a real space and a virtual space, it is possible to exactly know the fore and aft relationship between an object in the real space and an object in the virtual space, and always provide a very precise composite real space which is three-dimensionally consistent.

The individual components shown in outline or designated by blocks in the drawings are all well known in the image-display control apparatus arts and their specific construction and operation are not critical to the operation or the best mode for carrying out the invention.

While the present invention has been described with respect to what are presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-display control apparatus comprising:
    detection means for detecting a predetermined object from a photographed image;
    position calculation means for obtaining a positional relationship between the predetermined object in the photographed image detected by said detection means and an object in a virtual image;
    image removing means for removing a predetermined partial image in the object in the virtual image by referring to a calculation result of calculation of said position calculation means;
    synthesis means for synthesizing the virtual image and the photographed image so that the predetermined object in the photographed image is present at a position of the partial image in the virtual image removed by said image removing means; and display control means for displaying an image obtained as a synthesis result of of said synthesis means on display means.

2. An apparatus according to claim 1, further comprising:

image input means for inputting an image photographed by a camera for photographing a real space as the photographed image; and assumption means for assuming a position and a direction of an object in the real space, wherein said detection means detects the predetermined object from the photographed image input from said image input means, based on an assumption result of said assumption means.

3. An apparatus according to claim 2, wherein said assumption means assumes the position and a posture of the object from detection information of position/direction detection means for detecting the position and the direction of the object in the real space.

4. An apparatus according to claim 3, further comprising holding means for holding the detection information of the position/direction detection means when the object in the real space has a predetermined posture, wherein said assumption means assumes the position and the posture of the object in the real space based on the detection information in said holding means.

5. An apparatus according to claim 4, further comprising mask formation means for forming an external mask of the predetermined object in the photographed image obtained from said image input means, based on the position and the posture of the object in the real space assumed by said assumption means, wherein said image removing means removes the predetermined partial image in the virtual image using the external mask.

6. An apparatus according to claim 5, further comprising image formation means for forming the virtual image.

7. An image-display control apparatus comprising:

detection means for detecting a predetermined object from each of first and second photographed images obtained by photographing a real space;

position calculation means for obtaining a positional relationship between the predetermined objects in the first and second photographed images detected by said detection means and an object in a virtual image;

image removing means for removing predetermined partial images in the object in the virtual image by referring to a calculation result of calculation of said position calculation means;

synthesis means for forming a first synthesized image by synthesizing the virtual image and the first photographed image and forming a second synthesized image by synthesizing the virtual image and the second photographed image so that the predetermined objects in the first and second photographed images are present at respective positions of the partial images in the virtual image removed by said image removing means; and display control means for displaying the first synthesized image obtained by said synthesis means on display means for a left eye, and displaying the second synthesized image on display means for a right eye.

8. An apparatus according to claim 7, further comprising:

image input means for inputting respective images photographed by first and second cameras for photographing a real space as the first and second photographed images; and assumption means for assuming a position and a direction of an object in the real space, wherein said detection means detects the predetermined objects from the first and second photographed images input from said image input means, based on an assumption result of said assumption means.

9. An apparatus according to claim 8, wherein said assumption means assumes the position and a posture of the object from detection information of position/direction detection means for detecting the position and the direction of each of the object in the real space.

10. An apparatus according to claim 9, further comprising holding means for holding the detection information of the position/direction detection means when the object in the real space has a predetermined posture, wherein said assumption means assumes the position and the posture of the object in the real space based on the detection information in said holding means.

11. An apparatus according to claim 10, further comprising mask formation means for forming an external mask of each of the predetermined objects in the first and second photographed images obtained from said image input means, based on the position and the posture of the object in the real space assumed by said assumption means, wherein said image removing means removes the predetermined partial image in the virtual image using the external mask.

12. An apparatus according to claim 11, further comprising image formation means for forming the virtual image.

13. An image processing system comprising:

a camera for photographing a real space;

a position/direction sensor for detecting a position and a direction of an object in the real space;

a computer for synthesizing a photographed image photographed by said camera and a virtually formed virtual image; and display means for displaying an image obtained as a result of synthesis by said computer, said computer comprising:

input means for inputting the photographed image photographed by said camera;

detection means for detecting a predetermined object from the photographed image;

position calculation means for obtaining a positional relationship between the predetermined object in the photographed image detected by said detection means and an object in a virtual image;

image removing means for removing a predetermined partial image in the object in the virtual image by referring to a calculation result of calculation of said position calculation means;

synthesis means for synthesizing the virtual image and the photographed image so that the predetermined object in the photographed image is present at a position of the partial image in the virtual image removed by said image removing means; and display control means for displaying an image obtained as a synthesis result of said synthesis means on said display means.

14. A system according to claim 13, wherein said computer further comprises assumption means for assuming a position and a direction of an object in the real space, and wherein said detection means detects the predetermined object from the photographed image input from said image input means, based on an assumption result of said assumption means.

15. A system according to claim 14, wherein said assumption means assumes the position and a posture of the object from detection information of position/direction detection means for detecting the position and the direction of the object in the real space.

16. A system according to claim 15, wherein said computer comprises holding means for holding the detection information of the position/direction detection means when the object in the real space has a predetermined posture, and wherein said assumption means assumes the position and the posture of the object in the real space based on the detection information in said holding means.

17. A system according to claim 16, wherein said computer comprises mask formation means for forming an external mask of the predetermined object in the photographed image obtained from said image input means, based on the position and the posture of the object in the real space assumed by said assumption means, and wherein said image removing means removes the predetermined partial image in the virtual image using the external mask.

18. A system according to claim 17, further comprising image formation means for forming the virtual image.

19. An image generation system comprising:
first and second cameras for photographing the same real space;
a position/direction sensor for detecting a position and a direction of an object in the real space;
a computer for outputting first and second synthesized images by synthesizing first and second photographed images photographed by said first and second cameras, respectively, and a virtually formed virtual image; and
display means for a right eye and display means for a left eye for displaying the first and second synthesized images, respectively,
said computer comprising:
image input means for inputting the first and second photographed images;
detection means for detecting respective predetermined objects from the first and second photographed images;
position calculation means for obtaining a positional relationship between the predetermined objects in the first and second photographed images detected by said detection means and an object in a virtual image;
image removing means for removing predetermined partial images in the object in the virtual image by referring to a calculation result of said position calculation means;
synthesis means for forming a first synthesized image by synthesizing the virtual image and the first photographed image and forming a second synthesized image by synthesizing the virtual image and the second photographed image so that the predetermined objects in the first and second photographed images are present at respective positions of the partial images of the virtual image removed by said image removing means; and
display control means for displaying the first synthesized image obtained by said synthesis means on display means for a left eye, and displaying the second synthesized image on display means for a right eye.

20. A system according to claim 19, wherein said computer comprises assumption means for assuming a position and a direction of an object in the real space, and wherein said detection means detects each of the predetermined objects from the first and second photographed images input from said image input means, based on an assumption result of said assumption means.

21. A system according to claim 20, wherein said assumption means assumes the position and a posture of the object from detection information of position/direction detection means for detecting the position and the direction of the object in the real space.

22. A system according to claim 21, wherein said computer further comprises holding means for holding the detection information of the position/direction detection means when the object in the real space has a predetermined posture, and wherein said assumption means assumes the position and the posture of the object in the real space based on the detection information in said holding means.

23. A system according to claim 22, wherein said computer further comprises mask formation means for forming an external mask of each of the predetermined objects in the first and second photographed images obtained from said image input means, based on the position and the posture of the object in the real space assumed by said assumption means, and wherein said image removing means removes the predetermined partial image in the virtual image using the external mask.

24. A system according to claim 23, wherein said computer further comprises image formation means for forming the virtual image.

25. An image-display control method comprising:
a detection step of detecting a predetermined object from a photographed image;
a position calculation step of obtaining a positional relationship between the predetermined object in the photographed image detected in said detection step and an object in a virtual image;
an image removing step of removing a predetermined partial image in the object in the virtual image by referring to a calculation result in said position calculation step;
a synthesis step of synthesizing the virtual image and the photographed image so that the predetermined object in the photographed image is present at a position of the partial image in the virtual image removed in said image removing step; and
a display control step of displaying an image obtained as a synthesis result in said synthesis step on display means.

26. A method according to claim 25, further comprising:
an image input step of inputting an image photographed by a camera for photographing a real space as the photographed image; and
an assumption step of assuming a position and a direction of an object in the real space,
wherein in said detection step, the predetermined object is detected from the photographed image input in said image input step, based on an assumption result in said assumption step.

27. A method according to claim 26, wherein in said assumption step, the position and a posture of the object are assumed from detection information of position/direction detection means for detecting the position and the direction of the object in the real space.

28. A method according to claim 27, wherein the detection information of the position/direction detection means when the object in the real space has a predetermined posture is held, and wherein in said assumption step, the position and the posture of the object in the real space are assumed based on the held detection information in the position/direction detection means.

29. A method according to claim 28, wherein an external mask of the predetermined object in the photographed image obtained in said image input step is formed, based on the position and the posture of the object in the real space assumed in said assumption step, and wherein in said image removing step, the predetermined partial image in the virtual image is removed using the external mask.

30. A method according to claim 29, further comprising an image formation step of forming the virtual image.

31. A storage medium storing a processing program for said steps of said method according to claim 25.

32. An image-display control method comprising:

a detection step of detecting a predetermined object from each of first and second photographed images obtained by photographing the same real space;

a position calculation step of obtaining a positional relationship between the predetermined objects in the first and second photographed images detected in said detection step and an object in a virtual image;

an image removing step of removing predetermined partial images in the object in the virtual image by referring to a calculation result in said position calculation step;

a synthesis step of forming a first synthesized image by synthesizing the virtual image and the first photographed image and forming a second synthesized image by synthesizing the virtual image and the second photographed image so that the predetermined objects in the first and second photographed images are present at respective positions of the partial images of the virtual image removed in said image removing step; and a display control step of displaying the first synthesized image obtained in said synthesis step on display means for a left eye, and displaying the second synthesized image on display means for a right eye.

33. A method according to claim 32, further comprising:

an image input step of inputting respective images photographed by first and second cameras for photographing the same real space as the first and second photographed images; and an assumption step of assuming a position and a direction of an object in the real space, wherein in said detection step, the predetermined objects are detected from the first and second photographed images input in said image input step, based on an assumption result assumption in said assumption step.

34. A method according to claim 33, wherein in said assumption step, the position and a posture of each of the objects are assumed from detection information of position/direction detection means for detecting the position and the direction of each of the objects in the real space.

35. A method according to claim 34, wherein the detection information of the position/direction detection means when each of the objects in the real space has a predetermined posture is held, and wherein in said assumption step, the position and the posture of each of the objects in the real space are assumed based on the held detection information.

36. A method according to claim 35, wherein an external mask of each of the predetermined objects in the first and second photographed images obtained in said image input step is formed, based on the position and the posture of each of the objects in the real space assumed in said assumption step, and wherein in said image removing step, the predetermined partial image in the virtual image is removed using the external mask.

37. A method according to claim 36, further comprising an image formation step of forming the virtual image.

38. A storage medium storing a processing program for said steps of said method according to claim 32.

* * * * *

UNITED STATES PATENT AND TRADEMARK OFFICE
CERTIFICATE OF CORRECTION

PATENT NO.    : 6,822,643 B2
DATED         : November 23, 2004
INVENTOR(S)   : Taichi Matsui et al.

It is certified that error appears in the above-identified patent and that said Letters Patent is hereby corrected as shown below:

Column 14,
Line 11, "assumption result assumption" should read -- assumption result --.

Signed and Sealed this

Twenty-first Day of June, 2005

JON W. DUDAS
*Director of the United States Patent and Trademark Office*